United States Patent [19]
Pratt

[11] Patent Number: 4,931,729
[45] Date of Patent: Jun. 5, 1990

[54] METHOD AND APPARATUS FOR MEASURING STRAIN OR FATIGUE

[75] Inventor: Norman F. Pratt, Scottsdale, Ariz.

[73] Assignee: Allied-Signal Inc., Morris Township, Morris County, N.J.

[21] Appl. No.: 136,268

[22] Filed: Dec. 22, 1987

[51] Int. Cl.$^5$ .................. G01B 7/24; G01L 1/12; G01R 33/14; G01R 33/18
[52] U.S. Cl. ..................... 324/209; 73/779; 73/862.69; 324/223
[58] Field of Search .............. 324/209, 222, 223; 73/779, 862.36, 862.69

[56] References Cited

U.S. PATENT DOCUMENTS

| | | | |
|---|---|---|---|
| 2,401,094 | 5/1946 | Nicholson, Jr. | 324/209 |
| 2,656,714 | 10/1953 | Cartier | 324/209 X |
| 2,673,613 | 3/1954 | Irwin | 73/779 X |
| 2,732,713 | 1/1956 | Willits | 73/779 X |
| 2,912,642 | 11/1959 | Dahle | 324/209 |
| 3,423,673 | 1/1969 | Bailey et al. | |
| 3,427,872 | 2/1969 | Leep et al. | 324/209 X |
| 3,534,254 | 10/1970 | Semienko et al. | |
| 3,807,223 | 4/1974 | Juillerat et al. | 324/209 X |
| 3,898,555 | 8/1975 | Tellerman | 324/208 |
| 4,028,619 | 6/1977 | Edwards | 324/209 X |
| 4,039,935 | 8/1977 | Wilson | 324/209 |
| 4,235,243 | 11/1980 | Saha | 73/779 X |
| 4,408,160 | 10/1983 | King et al. | 324/209 |
| 4,414,855 | 11/1983 | Iwasaki | 324/209 X |
| 4,416,161 | 11/1983 | Barkhoudarian | 324/209 X |
| 4,497,209 | 2/1985 | Kwun et al. | 324/209 X |
| 4,523,482 | 6/1985 | Barkhoudarian | 324/209 X |
| 4,596,150 | 6/1986 | Kuhr | 324/209 X |
| 4,623,841 | 11/1986 | Stinson et al. | 324/223 |
| 4,641,093 | 2/1987 | Melgui et al. | 324/239 |

FOREIGN PATENT DOCUMENTS

| | | |
|---|---|---|
| 2342161 | 3/1975 | Fed. Rep. of Germany . |
| 4525033 | 1/1967 | Japan . |
| 56-101527 | 1/1980 | Japan . |
| 43945 | 11/1960 | Poland .................... 324/209 |
| 661049 | 3/1949 | United Kingdom . |

OTHER PUBLICATIONS

Kasimov et al.; Investigating Magnetic Properties of Steels During Fatigue Processes, *Nondestructive Methods of Testing*, Ind. Lab(U.S.A.), vol. 42, No. 12, Dec. 1976, pp. 1870–1873.

Mohri et al., Sensitive Force Transducers Using a Single Amorphous Core Multivibrator Bridge, IEEE Trans. on Magnetics, vol. MAG-15, No. 6, Nov. 1979, pp. 1806–1808.

S. Bhattacharya, K. Schroeder, "A New Method of Detecting Fatigue Crack Propagation in Ferromagnetic Specimens", Journal of Testing and Evaluation, vol. 3, No. 4, Jul. 1975, pp. 289–291.

*Primary Examiner*—Gerard R. Strecker
*Attorney, Agent, or Firm*—David B. Abel; Robert A. Walsh

[57] ABSTRACT

A magnetic domain strain gage and method of digitally measuring strain or fatigue within a ferromagnetic material by measuring the time required for an increasing magnetizing force to cause magnetic domains to flip orientation in a ferromagnetic material as a function of strain or stress within the material. The magnetic domain's maximum rate of flip is measured as a time differential by a high frequency digital oscillator which provides a digital signal indicative of the strain thereby providing increased compatibility with digital data acquisition systems and having a superior signal to noise ratio in comparison with present low signal level analog resistance strain gages.

55 Claims, 3 Drawing Sheets

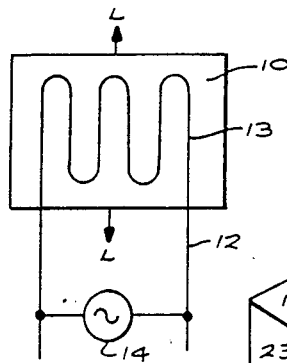
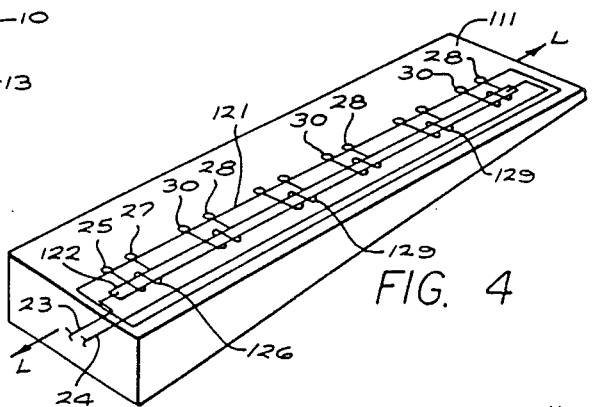
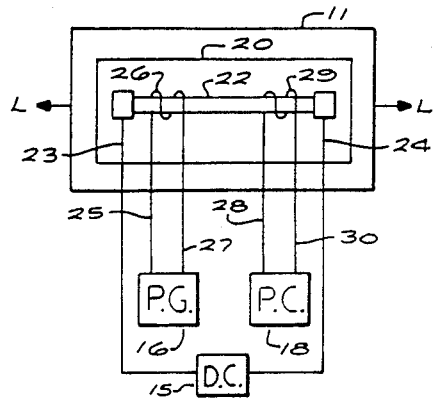
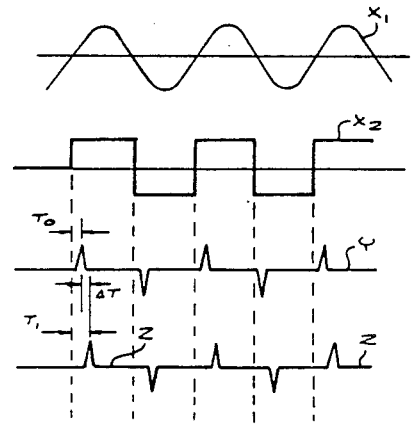
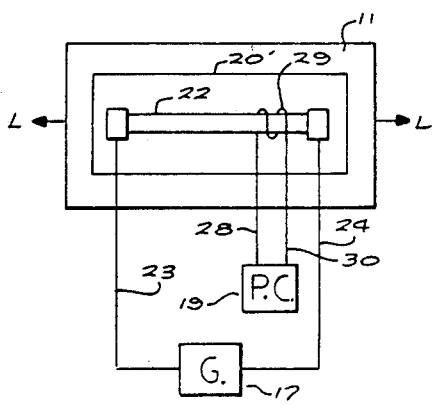
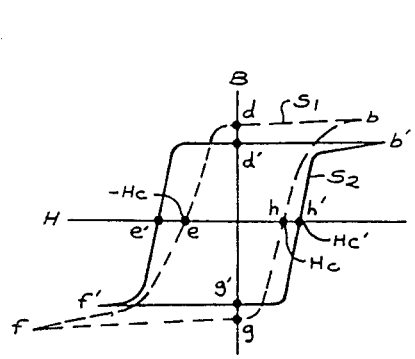
FIG. 1 (PRIOR ART)
FIG. 4
FIG. 2
FIG. 5
FIG. 3
FIG. 6

METHOD AND APPARATUS FOR MEASURING STRAIN OR FATIGUE

BACKGROUND OF THE INVENTION

This invention relates to a method and apparatus for digitally measuring strain or fatigue within a ferromagnetic material. More particularly, this invention relates to a method and apparatus which measures the change in time required for the magnetic domains within a ferromagnetic material to flip orientations in response to the application of a magnetic field to the ferromagnetic material as a strain or stress is applied to the ferromagnetic material. The invention may be used as a strain gage, attached to a substrate, in order to measure strain within the substrate.

In order to determine critical design parameters within various types of test elements or components within a machine, the designer must be able to accurately measure the stress (or strain) which the component may be subjected to under operating conditions. One method of measuring stress within a component is by the attachment of a strain gage to the component surface. Once calibrated, the strain gage can be used to determine the stresses within the component when the component is subjected to a load. Another method for non-destructive direct measurement of stress within a component made up of a ferromagnetic material, is based upon the attenuation of a magnetic pulse as it traverses the component.

Present strain gages, which are adapted to be attached to a substrate, operate on the principle that when a wire or foil is stretched the electrical resistance within the wire or foil changes due to the increase in length and decrease in diameter of the wire. Thus, by measuring the change in resistance of the wire or foil and referencing this change in resistance to a calibration of the strain gage, the stress or strain within the substrate onto which the strain gage is attached may be determined. The advantages of a resistance strain gage include relatively simple design and construction and easy attachment to the surface of any type of material. However, since the resistance within the wire or foil is also a function of the temperature to which the strain gage is subjected, as well as to other environment factors, the resistance type of strain gage is temperature limited and requires a complex functional algorithm in order to determine stress or strain within a material under varied or changing environments. Additionally, resistance strain gages provide a signal which is measured as a change in resistance, thus this signal is inherently analog in nature.

The other method of measuring stress, as disclosed within Japanese Pat. No. 56-10,527 issued to Y. Sougiyou, measures stress applied to a body by the attenuation of a magnetic flux within a detection piece made of a magnetic elastic material which is under stress. The stress is detected as a variation in the magnitude of the magnetic flux, which is measured by the amount of current produced within a detecting coil. This method of measuring stress also provides an analog output signal.

SUMMARY OF THE INVENTION

It is an object of the present invention to provide a strain gage which operates on the principle that the time required for the magnetic domains within a ferromagnetic material to flip orientation or switch alignment is dependent upon the stress state of the ferromagnetic material thereby allowing strain to be measured as a discrete time interval by providing a digital output indicative of the strain within the substrate to which the magnetic domain strain gage is attached.

A further object of the present invention is to provide a device to measure stress within a substrate based upon the change effected upon the magnetic hysteresis property of a ferromagnetic material utilized in the device caused by stress within the ferromagnetic material.

A further object of the present invention is to provide a device which may be used to determine fatigue within a substrate based upon the change effected upon the magnetic hysteresis property of a ferromagnetic material caused by fatigue within the ferromagnetic material.

A further object of the present invention is to provide a device which may be used to measure stress or fatigue in a plurality of locations upon a substrate based upon the change effected upon the magnetic hysteresis property of a ferromagnetic material caused by stress within the ferromagnetic material.

A further object of the present invention is to provide a strain gage which can operate at elevated temperatures including temperatures approaching the Curie point of a ferromagnetic material used within the strain gage.

A further object of the present invention is to provide means of measuring stress or fatigue as a discrete change in time as measured by a high frequency digital oscillator, thus providing a signal particularly adapted for use with digital signal processing and analyzing circuitry.

A further object of the present invention is to provide a magnetic domain strain gage which may be attached directly upon a substrate.

A further object of the present invention is to provide a method of forming a magnetic domain strain gage directly upon a substrate.

The present invention provides a magnetic domain strain gage which operates on the principle that the time required for the magnetic domains to flip orientations within a ferromagnetic material, in response to a changing magnetic field or magnetic pulse within the ferromagnetic material, varies with stress or fatigue within the ferromagnetic material. In practice, the magnetic domain strain gage is connected to external electrical circuitry which includes an accurate timing apparatus, thereby, under a zero or reference stress condition, the magnetic domain flip time caused by a magnetic pulse wave traversing the ferromagnetic material may be measured as a discrete time interval, $T_o$. When stress is applied to the conductive element, the magnetic domain orientation flip time of the domains within the ferromagnetic material changes, causing a change in the measured discrete time interval to $T_1$. The difference between $T_o$ and $T_1$ is the change in magnetic domain flip time or $\Delta T$. This change in magnetic domain flip time $\Delta T$ is directly proportional to the stress within the ferromagnetic material, and thus it is also directly proportional to the stress within a substrate to which the magnetic domain strain gage is attached.

The present invention further provides a means of directly measuring fatigue. Fatigue also causes a change in the hysterisis characteristics and magnetic domain flip time within a ferromagnetic material from $T_o$ to $T_f$. The amount of this change as measured by $T_f - T_o$, yields an indication of the fatigue state of the ferromagnetic material which may be correlated to the fatigue state of a substrate to which the magnetic domain strain gage is attached.

BRIEF DESCRIPTION OF THE DRAWINGS

FIG. 1 is an illustration of a prior art resistance type of strain gage.

FIG. 2 is an illustration of the magnetic domain strain gage of the present invention.

FIG. 3 is an illustration of an alternative embodiment of the magnetic domain strain gage.

FIG. 4 is an illustration of a second alternative embodiment of a magnetic domain strain gage.

FIG. 5 is a graph illustrating the input and output pulses of the magnetic domain strain gage of FIGS. 2 or 3.

FIG. 6 is a hysteresis curve for a ferromagnetic metal showing the effect of applied stress.

DESCRIPTION OF THE PREFERRED EMBODIMENT

Figure 8:
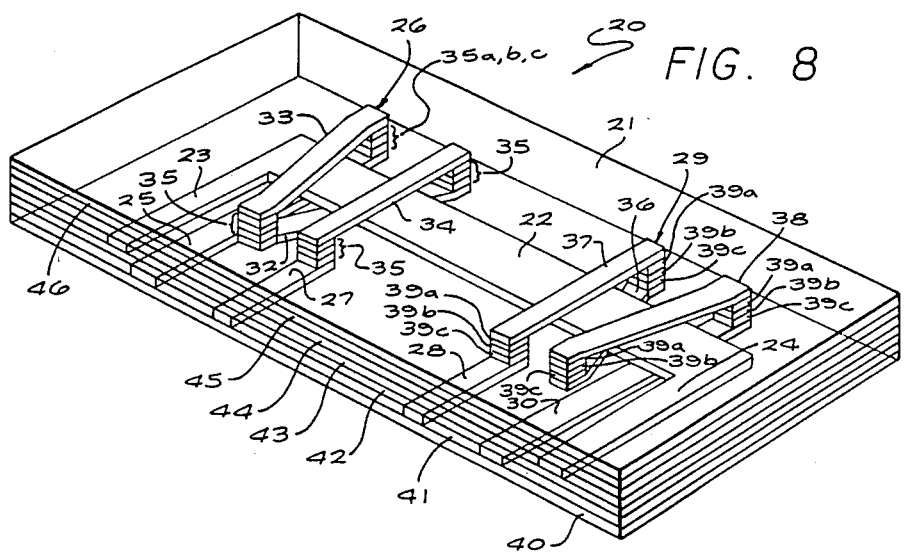
FIG. 8 is a detailed view of the magnetic domain strain gage of FIG. 2.

Referring now to the figures, FIG. 1 is an illustration of a common resistance type of strain gage 10, having a wire element 12 including a strain measuring section 13 adapted to be attached to the surface of a component. An ohm meter 14, connected to wire element 12 at opposite ends of strain measuring section 13, is used to measure the change in the resistance of the wire element 12 as a load L is applied. The resistance type strain gage 10 produces an analog signal output indicative of the stress within the component.

By comparison, FIGS. 2 through 4 show embodiments of the magnetic domain strain gage of the present invention. Within FIGS. 2 through 4 the same numbers will be used to identify common elements. FIG. 2 shows a magnetic domain strain gage 20 attached to the surface of a substrate 11. The magnetic domain strain gage 20 includes an electrically conductive element 22, which may be for example, a wire or a ribbon of ferromagnetic material and is preferably a ribbon of amorphous metal. Wire leads 23 and 24 connect opposite ends of conductive element 22 to external circuitry. This external circuitry includes a D.C. current generating means 15 shown schematically which produces a biasing current within conductive element 22. A pulse coil 26 proximate to conductive element 22 and preferably encircling conductive element 22 is connected by pulse coil leads 25 and 27 to a pulse generator 16. The pulse generator 16 routes a periodically changing electric current through pulse coil 26, causing a changing magnetic flux within conductive element 22, thereby initiating propagation of a traveling magnetic pulse wave within conductive element 22. A receiving coil 29, also proximate to the conductive element 22 and preferably encircling conductive element 22 and being spaced apart from pulse coil 26, is connected via receiving coil leads 28 and 30 to timing and processing circuitry 18, shown schematically. The timing and processing circuitry 18 is also connected to the pulse generator 16. When the pulse generator 16 couples a magnetizing force to conductive element 22 thru pulse coil 26, a digital counter within the timing and processing circuitry 18 is started. As the magnetic domains flip in conductive element 22 proximate to receiving coil 29, an electrical current is generated within receiving coil 29, due to the changing magnetic flux. This electric current in receiving coil 29 is detected by the timing and processing circuitry 18, and the digital counter is stopped. The discrete time interval captured by the digital counter provides a digital output measurement of the strain induced within substrate 11 by an applied load L.

FIG. 3 is similar to FIG. 2 and shows a magnetic domain strain gage 20' including the conductive element 22, wire leads 23 and 24, as well as the receiving coil 29 and receiving coil leads 28 and 30 connected to timing and processing circuitry 19. The differences between FIGS. 2 and 3 being that the functions of the current generator means 15, the pulse generator means 16, and pulse coil 26 of FIG. 2 have been combined into a pulse and current generator means 17 in FIG. 3. Pulse and current generator 17 provides a varying current, which may simply be an AC current, through conductive element 22 thereby also providing a changing magnetic field which causes the magnetic domains to flip in the conductive element 22. Magnetic pulses, caused by domain reversals, are detected by the receiving coil 29 and the timing and processing circuitry 18, similar to the process as detailed for FIG. 2 above.

FIG. 4 shows a magnetic domain strain gage 121 including a multiplicity of receiving coils 129 proximate to a conductive element 122. A pulse coil 126 may also be included proximate to the conductive element 122. The multiplicity of receiving coils 129 provides a number of discrete measurements of the strain within a substrate 111, for use in the case where strain varies within the substrate 111 due to loading and/or varying cross-sectional thickness of substrate 111. Thus, the magnetic domain strain gage 121 of FIG. 4 may be used to provide a complete map of the strain within substrate 111. The receiving coils 129 and the conductive element 122 may be arranged in any of a number of orientations in order to provide strain measurements along different axes.

In operation, the pulse generator 16 of FIG. 2 sends an electric current pulse to pulse coil 26, thereby producing a changing magnetic field around pulse coil 26 initiating the reversal of the orientation of the magnetic domains within conductive element 22. Simultaneously with the initiation of the magnetic pulse, the digital counter within timing and processing circuitry 18 is turned on. As the magnetic domains within conductive element 22 flip proximate to the receiving coil 29, the changing magnetic field causes receiving coil 29 to produce an output current pulse. This output current pulse is sent to the timing and processing circuitry 18 and stops the digital counter. The time interval captured within the timing and processing circuitry 18 is retained and provides the digital output signal. FIG. 5 diagrammatically illustrates this sequence. The top two lines $X_1$, $X_2$ in FIG. 5 illustrates the electric current pulse or wave generated by the pulse generator 16 of FIG. 2 or the pulse or wave generating means 17 of FIG. 3 as shown. This may be either a sinusoidal wave $X_1$ or a square wave $X_2$. The line Y of FIG. 5 shows the output current pulse wave produced by the flipping magnetic domains proximate to receiving coil 29 when conductive element 22 is not under stress. There is a discrete time interval $T_o$ between when the electric current pulses $X_1$ or $X_2$ of the top lines initiate the magnetic pulses and when the flipping domains in element 22 cause the output current pulse within receiving coil 29, as shown by the centerline Y. The bottom line Z of FIG. 5 shows the effect of strain within the conductive element 22 and illustrates the increase in the discrete time interval to $T_1$ between when the electric current pulses in pulse coil 26 couples enough magnetic force to flip the magnetic domains within conductive element 22 and induce a current pulse within receiving coil 29. The time differential $\Delta T$ between $T_o$ and $T_1$, as shown by the differences between the pulses on the line Y and the bottom line Z, is used as the measurement of the strain within the conductive element 22, and hence $\Delta T$ can be used to determine the strain within substrate 11 to which the conductive element 22 is attached.

The change in magnetization force (H) which is required to initiate the domain reversals in conductive element 22 may best be understood with reference to the microscopic properties of ferromagnetic materials, and the magnetic hysteresis curves as shown in FIG. 6, wherein the H axis represents the magnetizing force and the B axis represents the flux density. B and H are further related to the internal magnetization M of the material by the relation $\vec{B} = \vec{H} + 4\vec{M}\pi$. Within ferromagnetic materials, (also sometimes referred to as simply, magnetic materials), there is a coupling between the internal magnetization of the material (a vector quantity) and the mechanical state of the material, which reflects, inter alia, any stresses applied to the material. A variety of associated phenomena are known as magnetoelastic effects. Among the most important of these phenomena is magnetostriction. If the magnetization direction within a magnetic sample is changed, then the sample undergoes changes in its physical dimensions. For example, if a magnetic material is taken from an initial state, in which its magnetization is randomly distributed, to a final state, in which its magnetization is entirely directed along a given direction, then the sample's length along that direction changes by a fractional amount known as the saturation magnetostriction ($\lambda_s$). The value of $\lambda_s$ can be either positive or negative; typical magnitudes of $\lambda_s$ for the transition metals (Fe, Ni, and Co) are of the order $-10$ to 50 parts per million (ppm); for rare earth transition metal alloys, $\lambda_s$ can be as large as 2000 ppm. $\lambda_s$ provides a measure of the strength of the magnetoelastic coupling.

For materials having non-zero values of $\lambda_s$, the application of a uniaxial stress $\sigma$ gives rise to a magnetoelastic anisotropy energy per unit volume $K_s = \sigma \lambda_s \cos^2\theta$, where $\theta$ is the angle between the axis of the stress and the magnetization direction. The final direction of the magnetization direction is determined by an energy balance among the various sources of magnetic anisotropy and the dipolar energy $\vec{M}\cdot\vec{H}$, where $\vec{H}$ is the applied magnetic field and $\vec{M}$ is the magnetization. In addition to magnetoelastic anisotropy, there are other sources of anisotropy: magnetocrystalline anisotropy, shape anisotropy, and field-induced anisotropy. For materials having $\lambda_s > 0$ which are placed in tension, the magnetoelastic anisotropy contribution makes it energetically favorable for the magnetization to align with the tensile axis. For application in magnetic domain strain gages, the greatest linearity is presumed to be achieved by selection of materials in which the magnetoelastic contribution to the total anisotropy energy dominates the contributions from the magnetocrystalline and field-induced anisotropy energies. For sensitivity at low strain levels, it is preferred that the magnetic material has a low magnetocrystalline and field-induced anisotropy. This requirement is normally satisfied by so-called soft magnetic materials, i.e. those having low values of magnetic coercive field $H_c$.

It is thus believed by the inventors that suitable magnetic materials for the present invention are soft magnetic materials which are magnetostrictive, preferably those having $\lambda_s > 10$ ppm. A preferred class of magnetic materials to be employed in the present invention is the class of magnetic amorphous metals, which are also known as glassy metals or metallic glasses. Such materials exhibit metallic electrical and thermal conductivity, and x-ray diffraction patterns like those of oxide glasses, having broad halos instead of the sharp peaks seen in crystalline materials. Among the magnetic amorphous metals are materials having the general formulas $M_a Y_b Z_c$ and $M_d Y_e$, which are disclosed by U.S. Pat. No. 3,856,513 issued to Chen et al. A variety of techniques are known in the art for producing these materials in the form of wires, ribbons, and thin films. In general, the materials are formed by rapidly quenching the alloy from the melt at rates of at least $10^{4}$ °C/s, and more preferably, of at least $10^{6}$ °C/s. Alternatively, the materials are formed by atomistic deposition processes such as evaporation and sputtering.

Ferromagnetic amorphous metals exhibit a desirable combination of negligible magnetocrystalline anisotropy, low magnetic coercivity, and high hardness and tensile strength. The high strength and hardness are especially valuable for the present application. Most conventional crystalline soft magnetic materials which have low anisotropy also have low hardness and tensile strength. They are thus prone to plastic deformation at comparatively low strain levels. In contrast, many amorphous materials show a reversible stress-strain behavior at up to 100 ksi stress. Suitable amorphous materials are thus useful for application in strain gages requiring a stable, reproducible zero strain state and high upper strain limit.

A ferromagnet is composed of an assemblage of spontaneously magnetized regions called domains. Within each domain, the elementary atomic magnetic moments are essentially aligned resulting in each domain acting as a small magnet. An unmagnetized foil of ferromagnetic material is composed of numerous domains oriented so that the total magnetization is zero. The process of magnetization under an applied field H, consists of growth of those domains oriented most nearly with the direction of the applied field H, at the expense of other domains which are randomly aligned, followed by rotation of the direction of magnetization within the non-aligned domains against anistropy forces. On removal of the applied field H, some magnetization will remain. Under an applied magnetizing force H, domain growth proceeds by movement of the Bloch wall between domains. This takes place reversibly at first, then irreversibly, until the magnetic coercive force is reached. The irreversible nature of magnetization results in the demagnetization under an applied $-H$ field to not retrace the magnetization path. Under the influence of a strong demagnetizing field $-H$, the magnetic orientations of the domains may be made to rapidly change alignment, i.e. to flip into alignment with the $-H$ field. There is a tendency for the magnetization to show hysteresis, that is, to lag behind the applied field which, when plotted graphically, results in a hysteresis loop as shown in FIG. 6. The magnetic domain strain gage provides an apparatus for measuring the time required to flip the alignment of the magnetic domains, i.e. to measure the lag time or the increase in magnetization energy.

The magnetic domain strain gage may be operated at very high temperatures since the magnetic properties of ferromagnetic materials are relatively stable up to the Curie temperature $T_c$, (where a ferromagnet changes into a paramagnet). Thus, the present invention may be used at temperatures approaching the Curie temperature. By way of example, the Curie temperature of iron is 1043° K. (1418° F.).

The hysteresis curves of FIG. 6 are shown as representing the magnetic hysteresis loop for ferromagnetic material. In the case of an amorphous iron-based alloy the hysteresis loop is characterized as having a steep slope at the intersection of the H axis. The curve indicated by S1, i.e. bdefghb is an example of the hysteresis loop for an amorphous metal which is not under any stress or strain, and which for example, would produce the output pulse as illustrated by the centerline Y of FIG. 5. Curve S2 i.e. b'd'e'f'g'h'b' shows a hysteresis loop for the same amorphous iron-based alloy iron when a strain is applied to the alloy, and which would produce the output pulse illustrated by the bottom line Z of FIG. 5. Since the highest slopes on the B-H loop exist at the intersection of the H axis, it is at this point that dB/dt, which is proportional to the induced voltage, is maximum, causing the sharp output pulse produced within the receiving coil 29.

Strain causes a change in the shape of the walls of the magnetic domains, which results in a distortion of the hysteresis loop under an applied strain. This distortion causes an increase in the width of the hysteresis loop with reference to the H axis, and a decrease in the height along the B axis. Within the hysteresis loops, for curve S1, $H_c$ and for curve S2, $H_c'$, represent the magnetizing force at the positive crossing point for curves S1 and S2 on the H axis. The changes between curve S1 and S2 as a function of applied stress or strain is related to the change in magnetization force required to produce a change in the flux density B in conductive element 22 when conductive element 22 is under a no-load condition and when conductive element 22 is subjected to a stress load. This generally is the phenomena upon which the magnetic domain strain gages shown in FIGS. 2, 3 and 4 of the present invention are based.

The electric pulse generated by pulse generator 16 of FIG. 2 or pulse and current generator 17 of FIG. 3 is of sufficient magnitude to cause a magnetic pulse having a field strength which will saturate the magnetic domains within conductive element 22. It is presently believed that all of the magnetic domains in the conductive element 22 tend to orientate or flip simultaneously, with only small local variations. Increasing the stress within conductive element 22 increases the field strength (H) required to flip or realign the magnetic domains in the direction of H. This realignment must follow the hysteresis loop, which as has been described changes with an applied stress or strain, the time required for the magnetic domains to flip is directly linked to the distortion of the hysteresis loop since H is coupled to conductive element 22 as a function of time. In effect the magnetic domain strain gage measures the increase in time necessary to supply the additional magnetizing force to produce a maximum percentage of magnetic domain realignments.

Fatigue within conductive element 22 causes a permanent distortion of the walls of the magnetic domains, and thus a permanent distortion of the hysteresis loop. Fatigue may be measured by placing a magnetic domain fatigue gage identical to the strain gage of FIG. 2 or 3, upon a substrate, calibrating the B-H loop characteristic of the fatigue gage, subjecting the substrate and fatigue gage to cyclic stress thereby fatiguing the substrate, and measuring the change in the B-H loop characteristic of the fatigue gage. The fatigue state of the fatigue gage may be directly determined and the fatigue state of the substrate may thereby be inferred. This process provides for fatigue measurement within a component which in operation may be subjected to highly cyclic stresses in a harsh environment which is not condusive to the monitoring of the fatigue state of the component. Thus, for example, the fatigue gage of the present invention may be attached to a turbine blade within a turbine engine and then the turbine blade may be operated within the engine for a period of time. Subsequently, by measuring the change in the BH loop characteristic of the fatigue gage, the fatigue state of the turbine blade may be determined. The stability of the magnetic properties of ferromagnetic materials up to their Curie Temperature is particularly relevant in this example in that the turbine blade may be exposed to extremely high temperatures. As long as the Curie Temperature of the ferromagnetic material has not been exceeded, the magnetic domain walls will not be destroyed with the exception of the distortion of the magnetic domain walls caused by fatigue. Thus, the magnetic domain fatigue gage provides a very reliable measure of fatigue within elements which would normally not be easily evaluated.

It may be appreciated that al the square wave electric current pulse (FIG. 5 line $X_2$) is driven between a positive and a negative state at a regular interval, the timing of the current pulse induced within receiving coil 29 is somewhat dependent on the magnetic properties of the ferromagnetic material used for conductive element 22 and whether the magnetic pulse is going in a positive or negative direction. Thus, there may be a time difference between when the positive $T_o$ pulse and the negative $T_o$ pulse is received. Again referring to FIG. 6 with reference to curve S1, wherein $H_c$ represents the positive crossing of the H axis and $-H_c$ represents the negative crossing of the H axis, the absolute value of $H_c$ and of $-H_c$ may or may not be equivalent. In certain types of amorphous metals it may appear that the absolute values of $H_c$ and $-H_c$ are not equivalent. The apparent difference arises from a bias field, such as can be caused by the earths magnetic field or a drive circuit having a DC offset. Under these circumstances, the positive and negative current pulses produced within the receiving coils 29 will not occur at an equal time interval following the initiation of the magnetic pulse.

Figure 7:
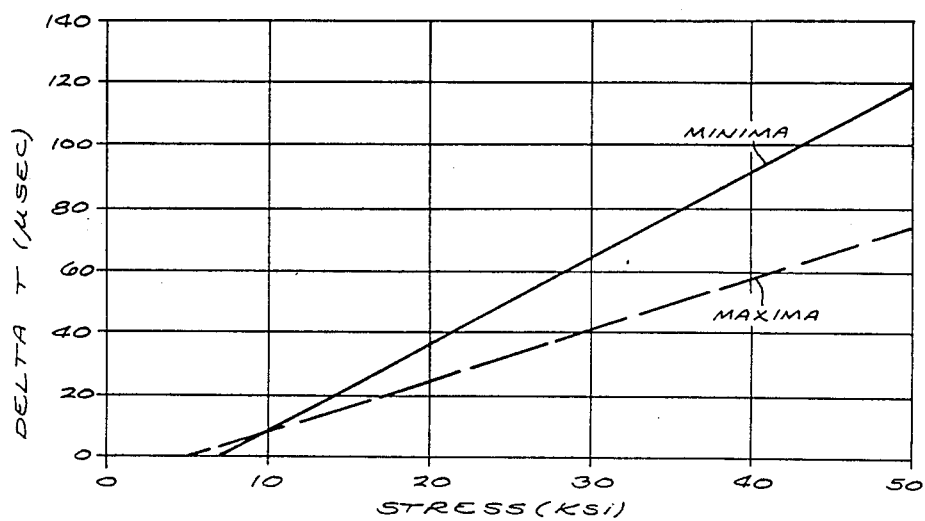
FIG. 7 is a graph showing stress as a function of the change in flip time of the magnetic domains for the magnetic domain strain gage of FIGS. 2 or 3.

FIG. 7 is a graph showing stress (ksi) vs. $\Delta T$ in microseconds for a test apparatus. In the test apparatus, the conductive element 22 had to be placed under a reference stress, $T_o$ was set at the reference stress resulting in the offset along the X axis. The two lines, labeled maxima and minima, represent measurements taken from respectively, the positive pulses of FIG. 5 for maxima and the negative pulses of FIG. 5 for the minima. These two lines illustrate the case of an amorphous metal in which the absolute values of $H_c$ and $-H_c$ are not equivalent, as described above. As illustrated graphically in FIG. 7, the stress vs. time plot is a straight line.

FIG. 8 shows a detailed view of the preferred embodiment of the strain gage 20 of FIG. 2. FIG. 8 illustrates the conductive element 22 as well as wire leads 23 and 24, pulse coil 26, pulse coil leads 25, 27, and receiving coil 29 embedded within an insulating carrier 21, for fabrication directly upon a substrate. Pulse coil 26 is made up of first, second and third pulse coil segments 32, 33, 34 and pulse coil post elements 35 a,b,c. Receiving coil 29 is made up of first, second, and third receiving coil segments 36, 37, 38 and receiving coil post elements 39 a,b,c. The conductive element 22 is shown as a layer of ferromagnetic material embedded within the insulating carrier 21. The conductive element 22 is formed from ferromagnetic material and is preferably an amorphous iron based alloy such as $Fe_{78} B_{13} Si_9$ (subscripts in atom percent). It may be appreciated that the magnetic domain strain gage 20 of FIG. 8 can be made relatively thin, on the order of, for example: 0.4 millimeters. It is also contemplated that the entire magnetic domain strain gage 20 could be miniaturized, down to the scale wherein the conductive element 22 is only a few magnetic domains in length.

Figure 9:
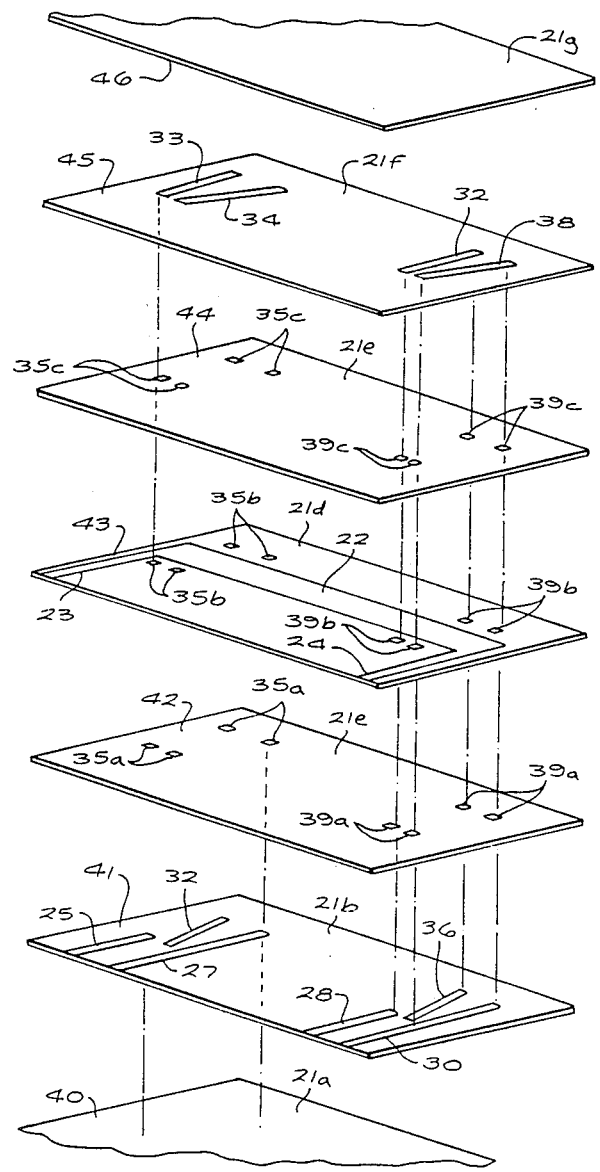
FIG. 9 is an exploded partial view illustrating the process of forming the magnetic domain strain gage of FIG. 8.

FIG. 9 is an exploded view illustrating the process of fabricating the magnetic domain strain gage 20 of FIG. 8. By this process, a first layer 40 of insulating material is applied directly upon the substrate. A second layer 41, having pulse coil leads 25, 27, receiving coil leads 28, 30, first pulse coil segment 32, and first receiving coil segment 36 within an insulating carrier 21, is then applied on top of first layer 40. A third layer 42, including insulating material and pulse coil post elements 35a as well as receiving coil post elements 39a is then applied atop of the second layer 41. The pulse coil post elements 35a within the third layer 42 align with the ends of pulse coil leads 25 and 27, as well as with opposite ends of first pulse coil segment 32. Similarly, receiving coil post elements 39a align with the ends of receiving coil leads 28 and 30, as well as with the ends of the first receiving coil segment 36. A fourth layer 43 is then applied atop of the third layer 42. The fourth layer 43 includes wire leads 23 and 24, as well as conductive element 22. Additionally, the fourth layer 43 includes pulse coil post elements 35b which are aligned with pulse coil post elements 35a of the third layer 42, as well as receiving coil post elements 39b which are also similarly aligned with receiving coil post elements 39a of the third layer 42. The wire leads 23, 24 and conductive element 22, as well as the pulse coil post elements 35b and receiving coil post elements 39b are all carried within the insulating material. A fifth layer 44 is then applied atop of the fourth layer 43. The fifth layer 44 includes pulse coil post elements 35c which are aligned with the pulse coil post elements 35b of the fourth layer 43, fifth layer 44 also includes receiving coil post elements 39c which are aligned with receiving coil post elements 39b of fourth layer 43. The fifth layer 44 also includes the insulating material surrounding the pulse coil post elements 35c and receiving coil post elements 39c. A sixth layer 45 is then applied atop of the fifth layer 44. The sixth layer 45, includes second pulse coil segment 33, third pulse coil segment 34, second receiving coil segment 37 and third receiving coil segment 38, all carried within the insulating material. A first end of second pulse coil segment 33 is vertically aligned with one end of the pulse coil lead 25 of the second layer 41, while the opposite end of second pulse coil segment 33 is vertically aligned with one end of the first pulse coil segment 32 within the second layer 41. The opposite end of first pulse coil segment 32 within second layer 41 is vertically aligned with a first end of third pulse coil segment 34 within the sixth layer 45, the other end of third pulse coil segment 34 being vertically aligned with one end of pulse coil lead 27. The pulse coil post elements 35 a,b,c provide the vertical conducting path between the second layer 41 and the sixth layer 45. Similarly, a first end of second receiving coil segment 37 within the sixth layer 45 is vertically aligned with one end of receiving coil lead 28 within second layer 41, while the other end of second receiving coil segment 37 is vertically aligned with a first end of first receiving coil segment 36. The other end of first receiving coil segment 36 is vertically aligned with one end of the third receiving coil segment 38, while the other end of the third receiving coil segment 38 is vertically aligned with one end of receiving coil lead 30 within the second layer 41. The receiving coil post elements 39 abc provide the conducting path between the second layer 41 and the sixth layer 45 for receiving coil 29. A seventh layer 46 is then applied on top of the sixth layer 45, the seventh layer 46 being completely formed from an insulating material.

In one embodiment of the invention, the first layer 40 and the seventh layer 46, as well as the insulation portions of the second through sixth layers 41–45, are formed of a radiation curable dielectric material. The first layer 40 may be formed by the process steps of:

(a) applying the first insulation layer of a radiation curable dielectric material to a given area of the substrate;

(b) exposing the first layer to a source of radiation to cure the dielectric material.

The second, third, fourth, fifth and six layers, 41–45 may preferably be formed by the process steps of:

(a) applying a layer of a radiation curable dielectric material atop the previously cured layer;

(b) placing a photomask defining the conductive elements adjacent to the surface of the layer of radiation curable dielectric material;

(c) exposing the photomask to a source of radiation and developing the photomask to expose those regions of the previously applied and cured layer where the conductive elements are to be formed;

(d) forming the conductive elements on the surface of the previous layer by plating, spraying, or deporting a metal coating onto those regions of the previous layer covered by the exposed layer of the curable dielectric material.

The seventh layer 46 can be applied in a process identical to the process for the first layer 40.

An alternative process for forming the present invention, wherein the first layer 40 and the seventh layer 46, as well as the insulation portions of the second through sixth layers 41–45, are formed from Aluminum Oxide ($Al_2 O_3$) includes the process steps of:

(a) sputtering a thin film of $Al_3 O_2$ to form the first layer;

(b) applying a sputtering mask and sputtering conductive material atop portions of the previous layer;

(c) sputtering a thin film of $Al_2 O_3$ on top of the previous layer;

(d) applying an etching mask and etching portions of the thin film of $Al_2 O_3$ where necessary;

(e) repeating steps b, c, and d utilizing different sputtering and etching masks to form the third layer;

(f) repeat step e to form the fourth layer;

(g) repeat step e to form the fifth layer;

(h) repeat step e to form the sixth layer;

(i) repeat step a to form the seventh layer.

Although several embodiments and examples of the present invention have been detailed hereinabove, it will be apparent to those skilled in the art that the invention is capable of a variety of alternative embodiments and applications. Accordingly, the invention is not to be construed as being limited to the above embodiments and examples, but only by the scope of the following claims.

What is claimed is:

1. A strain gage comprising:
a ferromagnetic conductive element having a plurality of magnetic domains;
conductors attached to opposite ends of said ferromagnetic conductive element adapted for connection to a means for generating an electric biasing current;
means for initiating a changing magnetic field proximate to one end of said ferromagnetic conductive element, said magnetic field reversing the magnetic orientation of a majority of said plurality of magnetic domains, said means for initiating adapted for connection to an external power source;
means for producing a signal indicative of the reversing of said plurality of magnetic domains, said means proximate to said ferromagnetic conductive element, and
carrier means carrying at least said conductive element for securely positioning at least said conductive element, and for allowing attachment to a substrate.

2. The strain gage of claim 1, wherein said means for producing a signal includes a receiving coil proximate to said conductive element, said receiving coil responsive to said reversal of said magnetic domains to produce an electric current pulse.

3. The strain gage of claim 1, wherein said means for initiating said magnetic pulse includes a pulse coil proximate to said ferromagnetic conductive element.

4. The strain gage of claim 2, wherein said receiving coil encircles said ferromagnetic conductive element.

5. The strain gage of claim 3, wherein said pulse coil encircles said ferromagnetic conductive element.

6. The strain gage of claim 1, wherein said carrier means carrying at least said ferromagnetic conductive element is an insulating carrier.

7. The strain gage of claim 6, wherein said insulating carrier is adapted for attachment to a substrate.

8. The strain gage of claim 1, wherein said ferromagnetic conductive element is a foil of amorphous metal.

9. The strain gage of claim 1 wherein said ferromagnetic conductive element is a wire of amorphous metal.

10. An apparatus for measuring strain comprising:
a ferromagnetic conductive element;
means for causing a biasing current within said ferromagnetic conductive element;
means for providing a varying magnetic field proximate to one end of said ferromagnetic conductive element to thereby initiate a varying magnetic field causing the reversal of the magnetic orientation of a plurality of magnetic domains within said ferromagnetic conductive element;
means for determining a time interval required for said plurality of magnetic domains to reverse orientation, said time interval being proportional to the strain within said ferromagnetic conductive element, and
carrier means carrying at least said conductive element for securely positioning at least said conductive element, and for allowing attachment to a substrate.

11. The apparatus of claim 10, wherein said means for causing a biasing current and said means for providing a varying magnetic field is a pulse and current generator in electrical connection with opposite ends of said ferromagnetic conductive element.

12. The apparatus of claim 10 wherein said means for determining a time interval includes a search coil proximate to said ferromagnetic conductive element.

13. The apparatus of claim 10, wherein said means for determining a time interval includes a timing circuit and a processing circuit.

14. The apparatus of claim 13, wherein said processing circuit includes a means for communicating with said means for providing a varying magnetic field.

15. The apparatus of claim 13 wherein said timing circuit includes a high frequency digital oscillator.

16. The apparatus of claim 10 wherein said means for providing a varying magnetic field includes a pulse coil proximate to said ferromagnetic conductive element.

17. The apparatus of claim 10, wherein said ferromagnetic conductive element is an amorphous metal.

18. The apparatus of claim 17 wherein said amorphous metal is amorphous iron-based alloy.

19. The apparatus of claim 10 wherein said carrier means carrying said ferromagnetic conductive element is an insulating carrier.

20. The apparatus of claim 19 wherein said insulating carrier is adaptable for attachment to a substrate.

21. The apparatus of claim 19 wherein said means for determining a time interval includes a receiving coil proximate to said ferromagnetic conductive element, said receiving coil being mounted within said insulating carrier.

22. The apparatus of claim 19, wherein said means for providing a varying magnetic field includes a pulse coil mounted within said insulating carrier.

23. A strain gage comprising: a ferromagnetic conductive element having a plurality of magnetic domains;
conductors attached to opposite ends of said ferromagnetic conductive element adapted for connection to a means for generating an electric biasing current;
means, connected to an external power source, for initiating a varying magnetic field at one end of said ferromagnetic conductive element, said magnetic field being sufficiently great in magnitude to cause the reversal of the magnetic orientation of said plurality of magnetic domains;
a plurality of means for producing a plurality of signals indicative of the reversal of the magnetic orientation of said magnetic domains caused by said varying magnetic field, said plurality of means located proximate to said ferromagnetic conductive element and spaced apart from one another, and
carrier means carrying at least said conductive element for securely positioning at least said conductive element, and for allowing attachment to a substrate.

24. The strain gage of claim 23, wherein said plurality of means for producing a signal includes a plurality of receiving coils said plurality of receiving coils responsive to said varying magnetic field to produce an electric current pulse.

25. The strain gage of claim 23, wherein said carrier means carries said ferromagnetic conductive element and said plurality of means for producing a plurality of signals mounted within an insulating carrier.

26. An apparatus for measuring strain comprising:
a ferromagnetic conductive element;
means for causing a biasing current within said ferromagnetic conductive element;
means for providing a varying magnetic field proximate to one end of said ferromagnetic conductive element to thereby initiate a magnetic pulse within said ferromagnetic conductive element, said magnetic pulse propagating along said conductive element reversing the magnetic orientation of a plurality of magnetic domains within said ferromagnetic conductive element, said reversal of the magnetic orientation of said domains lagging behind and limiting the magnetic pulse according to a material and stress specific hysteresis characteristic;
a plurality of means for determining a plurality of time intervals required for said magnetic pulse to couple sufficient magnetizing force to reverse the magnetic orientation of said magnetic domains of said ferromagnetic conductive element at a plurality of locations, said time intervals being proportional to the strain within said ferromagnetic conductive element; and
carrier means carrying said conductive element for securely positioning at least said conductive element, and for allowing attachment to a substrate.

27. The apparatus of claim 26, wherein said plurality of means for determining of plurality of time intervals includes a plurality of receiving coils spaced apart and proximate to said ferromagnetic conductive element.

28. The apparatus of claim 27, wherein said carrier means carries said ferromagnetic conductive element and said plurality of receiving coils mounted in an insulating carrier.

29. The apparatus of claim 27, wherein said plurality of receiving coils encircle said ferromagnetic conductive element.

30. The apparatus of claim 26, wherein said ferromagnetic conductive element is amorphous iron-based alloy.

31. A strain measuring apparatus comprising:
a ferromagnetic element having a plurality of magnetic domains;
means for causing reversal of the magnetic orientation of said plurality of magnetic domains;
means, proximate said ferromagnetic element, for digitally determining a reference value representing the zero crossing of the B-H curve magnetic hysteresis property of said ferromagnetic element when said ferromagnetic element is subjected to a known stress and for digitally measuring a change from said reference value in the zero crossing of the B-H curve magnetic hysteresis property of said ferromagnetic element, said measured change being proportional to and caused by strain within said ferromagnetic element;
means for determining a time interval, quantifying said change in said reference value required for said plurality of magnetic domains to reverse magnetic polarity; and
means for producing a signal indicative of the strain state of said ferromagnetic element.

32. The apparatus of claim 31 wherein said means for causing reversal of the magnetic orientation comprises:
means for inducing a biasing electrical current within said ferromagnetic element, and
means for initiating a changing magnetic field within said ferromagnetic element.

33. The apparatus of claim 32 wherein said means for initiating a changing magnetic field includes a variable electric current generator.

34. The apparatus of claim 33 wherein said means for initiating a changing magnetic field includes a pulse coil electrically connected to said variable electric current generator, said pulse coil located proximate to said ferromagnetic element.

35. The apparatus of claim 34 wherein said pulse coil encircles said ferromagnetic element.

36. The apparatus of claim 32 wherein said means for determining said time interval comprises:
a pulse receiving coil adapted for generating a stop signal electric pulse induced by said changing magnetic field, said pulse receiving coil proximate to said ferromagnetic element; and
circuitry means in electrical connection with said pulse receiving coil, said circuitry means adapted to receive a start signal input indicative of an initiation of a change in said magnetic field.

37. The apparatus of claim 36 wherein said circuitry means includes a high frequency oscillator, said high frequency oscillator being turned on upon receipt of said start signal input and turned off upon receipt of said stop signal from said pulse receiving coil.

38. A method of measuring strain within a substrate comprising:
attaching a ferromagnetic element having a plurality of magnetic domains to said substrate;
determining a reference value representing the zero crossing of the B-H curve magnetic hysteresis property of said ferromagnetic element when said ferromagnetic element is subjected to a known stress level;
measuring a change from said reference value in the zero crossing of the B-H curve magnetic hysteresis property of said ferromagnetic element, said measured change caused by strain within said ferromagnetic element and directly proportional to strain within said substrate;
determining a time interval required for said plurality of magnetic domains to reverse magnetic polarity corresponding to said measured change in said zero crossing; and
producing a signal indicative of the strain state of said ferromagnetic element.

39. The method of claim 38 wherein causing a reversal of the magnetic orientation comprises:
inducing a biasing electrical current within said ferromagnetic element; and
initiating a changing magnetic field within said ferromagnetic element.

40. The method of claim 39 wherein determining said time interval comprises:
providing circuitry means including a high frequency oscillator;
turning on said high frequency oscillator upon receipt of a start signal indicative of the initiation of said changing magnetic field; and
turning off said high frequency oscillator upon receipt of a stop signal induced by said changing magnetic field within a pulse receiving coil in electrical connection with said circuitry means.

41. A method of measuring strain comprising:

providing a ferromagnetic element;
causing a biasing current within said ferromagnetic element;
initiating a first magnetic pulse within said ferromagnetic element, said magnetic pulse propagating in the direction of said biasing current;
determining a first reference time interval required for said magnetic pulse to traverse at least a portion of said ferromagnetic element when said ferromagnetic element is subjected to a reference strain;
applying a strain to said ferromagnetic element;
initiating a second magnetic pulse within said ferromagnetic element;
determining a second time interval required for said second magnetic pulse to traverse said portion of said strained ferromagnetic element; and
quantifying the difference between said first time interval and said second time interval as a function of applied strain.

42. The method of claim 41 wherein determining said first and second time intervals comprises:
starting a high frequency oscillator clock simultaneous with said initiation of said first and second magnetic pulses;
stopping said high frequency oscillator clock simultaneous to when said first and second magnetic pulses have traversed said portion of said ferromagnetic element.

43. The method of claim 41 further comprising:
determining a plurality of said first and said second time intervals required for said first and second magnetic pulses to traverse said ferromagnetic element to a plurality of locations along said ferromagnetic element.

44. A fatigue gage comprising:
a ferromagnetic conductive element having a plurality of magnetic domains;
conductors attached to opposite ends of said ferromagnetic conductive element adapted for connection to a means for generating an electric biasing current;
means for initiating a varying magnetic field proximate to one end of said ferromagnetic conductive element, said varying magnetic field causing the reversal of the magnetic orientation of said plurality of magnetic domains, said means for initiating adapted for connection to an external power source;
means for producing a signal indicative of the reversal of a majority of said magnetic domains, said means for producing a signal located proximate to said ferromagnetic conductive element, and spaced apart from said means for initiating; and
carrier means carrying at least said conductive element for securely positioning at least said conductive element, and for allowing attachment to a substrate.

45. The fatigue gage of claim 44, wherein said means for producing a signal includes a receiving coil proximate to said conductive element, said receiving coil responsive to said reversal of said magnetic domains to produce an electric current pulse.

46. The fatigue gage of claim 41, wherein said means for initiating said magnetic pulse includes a pulse coil proximate to said ferromagnetic conductive element.

47. The fatigue gage of claim 45, wherein said receiving coil encircles said ferromagnetic conductive element.

48. The fatigue gage of claim 46, wherein said pulse coil encircles said ferromagnetic conductive element.

49. The fatigue gage of claim 44, wherein said carrier means carrying said at least said ferromagnetic conductive element is an insulating carrier.

50. The fatigue gage of claim 49, wherein said insulating carrier is adapted for attachment to a substrate.

51. The fatigue gage of claim 44, wherein said ferromagnetic conductive element is a foil of amorphous metal.

52. The fatigue gage of claim 44, wherein said ferromagnetic conductive element is a wire of amorphous metal.

53. An apparatus for measuring fatigue comprising:
a ferromagnetic conductive element;
means for causing a biasing current within said ferromagnetic conductive element to thereby initiate a magnetic pulse within said ferromagnetic conductive element, said magnetic pulse propagating in the direction of said biasing current and reversing the magnetic orientation of a plurality of magnetic domains within said ferromagnetic conductive element;
means for determining a time interval required for said magnetic pulse to couple sufficient magnetizing force to reverse the magnetic orientation of said plurality of magnetic domains of said ferromagnetic conductive element, said time interval being proportional to the fatigue within said ferromagnetic conductive element; and
carrier means carrying said conductive element for securely positioning at least said conductive element, and for allowing attachment to a substrate.

54. A fatigue gage comprising:
a ferromagnetic conductive element having a plurality of magnetic domains;
conductors attached to opposite ends of said ferromagnetic conductive element adapted for connection to a means for generating an electric biasing current;
means, connected to an external power source, for initiating a magnetic pulse at one end of said ferromagnetic conductive element, said magnetic pulse propagating in the direction of said biasing current and reversing the magnetic orientation of said plurality of magnetic domains;
a plurality of means for producing a plurality of signals indicative of the reversal of the magnetic orientation of said magnetic domains of said conductive element, said plurality of means located proximate to said ferromagnetic conductive element and spaced apart from one another; and
carrier means carrying said conductive element for securely positioning at least said conductive element, and for allowing attachment to a substrate.

55. An apparatus for measuring fatigue comprising:
a ferromagnetic conductive element;
means for causing a biasing current within said ferromagnetic conductive element;
means for providing a varying magnetic field proximate to one end of said ferromagnetic conductive element to thereby initiate a magnetic pulse within said ferromagnetic conductive element, said magnetic pulse propagating along said conductive element and reversing the magnetic orientation of a plurality of magnetic domains within said ferromagnetic conductive element;

a plurality of means for determining a plurality of time intervals required for said magnetic pulse to couple sufficient magnetizing force to cause the reversal of the magnetic orientation of said magnetic domains of said ferromagnetic conductive element at a plurality of spaced apart locations, said time intervals being proportional to the fatigue strain within said ferromagnetic conductive element; and carrier means carrying said conductive element for securely positioning at least said conductive element, and for allowing attachment to a substrate.

* * * * *